(12) United States Patent
Nagpal et al.

(10) Patent No.: US 8,445,088 B2
(45) Date of Patent: May 21, 2013

(54) GREEN PACKAGING

(75) Inventors: Vidhu Nagpal, Murrysville, PA (US);
Michael Okoroafor, Gibsonia, PA (US);
William Rasile, Allison Park, PA (US)

(73) Assignee: H.J. Heinz Company, Pittsburgh, PA (US)

( * ) Notice: Subject to any disclaimer, the term of this patent is extended or adjusted under 35 U.S.C. 154(b) by 0 days.

(21) Appl. No.: 13/242,136

(22) Filed: Sep. 23, 2011

(65) Prior Publication Data

US 2012/0074027 A1 Mar. 29, 2012

Related U.S. Application Data

(60) Provisional application No. 61/387,733, filed on Sep. 29, 2010.

(51) Int. Cl.
*B29D 22/00* (2006.01)
(52) U.S. Cl.
USPC ............ 428/35.7; 428/35.8; 206/524.6
(58) Field of Classification Search
USPC ............ 428/35.7, 35.8, 34.1; 206/524.6
See application file for complete search history.

(56) References Cited

U.S. PATENT DOCUMENTS

| | | | |
|---|---|---|---|
| 5,270,421 A | 12/1993 | Dordick et al. | |
| 6,242,102 B1 | 6/2001 | Tomka | |
| 7,128,969 B2 | 10/2006 | Busch et al. | |
| 7,214,754 B2 | 5/2007 | Nagpal | |
| 7,420,011 B2 | 9/2008 | Mohanty et al. | |
| 7,556,757 B2 | 7/2009 | Xu | |
| 7,678,444 B2 | 3/2010 | Tedford, Jr. et al. | |
| 7,700,172 B2 | 4/2010 | Renn | |
| 2005/0118371 A1 | 6/2005 | Shi et al. | |
| 2008/0160327 A1 | 7/2008 | Knoerzer et al. | |
| 2008/0249212 A1 | 10/2008 | Sigworth et al. | |
| 2008/0280117 A1 | 11/2008 | Knoll et al. | |
| 2008/0311813 A1 | 12/2008 | Ting et al. | |
| 2008/0312485 A1 | 12/2008 | Takai et al. | |
| 2009/0017240 A1* | 1/2009 | Charbonnel et al. | 428/35.2 |
| 2009/0036639 A1 | 2/2009 | Zhang et al. | |
| 2009/0048368 A1 | 2/2009 | Bash et al. | |
| 2009/0120816 A1 | 5/2009 | Ruman et al. | |
| 2009/0269527 A1 | 10/2009 | Collias et al. | |
| 2009/0274920 A1 | 11/2009 | Li et al. | |
| 2009/0299109 A1 | 12/2009 | Gruber et al. | |
| 2010/0000902 A1 | 1/2010 | Roberts et al. | |

(Continued)

FOREIGN PATENT DOCUMENTS

| | | |
|---|---|---|
| EP | 1102569 B1 | 9/2003 |
| WO | WO 2009013489 A1 | 1/2009 |
| WO | WO 2009022195 A1 | 2/2009 |
| WO | WO 2009027741 A1 | 3/2009 |
| WO | WO 2010012946 A2 | 2/2010 |
| WO | WO 2010053592 A1 | 5/2010 |
| WO | WO 2010063947 A1 | 6/2010 |
| WO | WO 2010066830 A1 | 6/2010 |
| WO | WO 2010072783 A1 | 7/2010 |

OTHER PUBLICATIONS

"Standard Test Methods for Determining the Biobased Content of Solid, Liquid, and Gaseous Samples Using Radiocarbon Analysis" ASTM International, pp. 1-15, IHS, West Conshohocken, PA, USA, Date 2010.

*Primary Examiner* — N. Edwards
(74) *Attorney, Agent, or Firm* — Duane Morris LLP

(57) ABSTRACT

A flexible food package includes a laminate body defining an internal compartment. The laminate body includes an inner layer and an outer layer that are coupled together. At least one of the inner layer and the outer layer includes green polyethylene having a percent modern carbon value of at least 30 percent.

17 Claims, 4 Drawing Sheets

U.S. PATENT DOCUMENTS

| | | |
|---|---|---|
| 2010/0028512 A1 | 2/2010 | Kriegel et al. |
| 2010/0034761 A1 | 2/2010 | Fenyvesi et al. |
| 2010/0044928 A1 | 2/2010 | Kurian et al. |
| 2010/0048767 A1 | 2/2010 | Nascimento et al. |
| 2010/0069589 A1 | 3/2010 | Bradin |
| 2010/0069691 A1 | 3/2010 | Morschbacker |
| 2010/0080944 A1 | 4/2010 | Etesse |
| 2010/0086714 A1 | 4/2010 | Sato |
| 2010/0129642 A1 | 5/2010 | Gröndahl et al. |
| 2010/0159170 A1 | 6/2010 | Wang et al. |
| 2011/0274892 A1* | 11/2011 | Chang et al. ............... 428/195.1 |
| 2012/0074027 A1* | 3/2012 | Nagpal et al. ............... 206/524.6 |

* cited by examiner

GREEN PACKAGING

CROSS-REFERENCE TO RELATED APPLICATIONS

This application claims priority to U.S. Provisional Patent Application No. 61/387,733, which was filed on Sep. 29, 2010, the entirety of which is herein incorporated by reference.

FIELD OF DISCLOSURE

The disclosure relates to packaging materials. More specifically, the disclosure relates to packaging materials formed from renewable resources and may be used for packaging food.

BACKGROUND

Consumers and manufacturers are increasingly concerned with the environmental impact of all products and product packaging. Perhaps the single greatest environmental concern for consumers, and consequently for manufacturers, is global warming and the greenhouse gases that contribute to global warming. Greenhouse gases are gases that allow sunlight to freely enter the Earth's atmosphere. When sunlight strikes the Earth's surface, some of the sunlight is reflected back towards space as infrared radiation. Greenhouse gases absorb the infrared radiation thereby trapping heat in the Earth's atmosphere. Over a period of time, the amount of energy sent from the sun to the Earth's surface should be about the same as the amount of energy radiated back into space resulting in the temperature of the Earth's surface being approximately constant. However, the increase in the quantity of greenhouse gases above the quantity that existed before the rise of human industrialization is thought to have increased the retained heat on the Earth's surface and leads to global warming.

Carbon dioxide ($CO_2$) has been singled out as the largest component of the collection of greenhouse gases in the atmosphere. For example, the level of atmospheric $CO_2$ has increased by approximately 50 percent in the last two hundred years. The increasing amount of $CO_2$ introduced into the atmosphere by fossil fuel-based materials is believed to be a large contributor to the greenhouse gas effect and the increase in global temperatures. Consumers and environmental protection groups alike have identified industrial release of carbon into the atmosphere as the source of carbon causing the greenhouse effect. However, organic products composed of carbon molecules from renewably based sources, such as plant sugars and starches, are considered to not further contribute to the greenhouse effect compared to the same organic molecules that are petroleum or fossil fuel based.

SUMMARY

A flexible food package is disclosed that includes a laminate body defining an internal compartment. The laminate body includes an inner layer and an outer layer that are coupled together. At least one of the inner layer and the outer layer includes green polyethylene having a percent modern carbon value of at least 30 percent.

Also disclosed is a food package including a body defining an internal compartment. The body includes green polyethylene having a percent of modern carbon value of at least 30 percent.

A food package top is disclosed that includes a body configured to engage a food package. The body of the food package top includes green polyethylene having a percent of modern carbon value of at least 30 percent.

A food package is disclosed that includes a body defining an internal compartment for storing a food product, and a cap coupled to the body for sealing the food product within the internal compartment. At least one of the body and the cap include green polyethylene having a percent of modern carbon value of at least 30 percent.

BRIEF DESCRIPTION OF THE DRAWINGS

These and other features and advantages of the present invention will be more fully disclosed in, or rendered obvious by the following detailed description of the preferred embodiments of the invention, which are to be considered together with the accompanying drawings wherein like numbers refer to like parts and further wherein.

DETAILED DESCRIPTION

Figure 1:
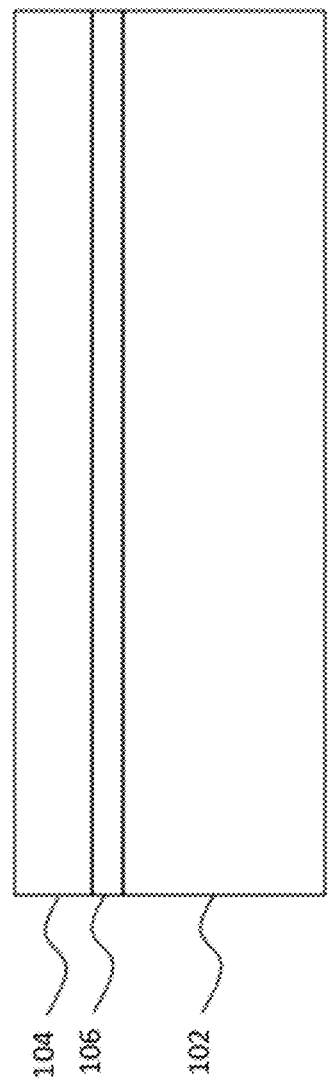
FIG. 1 illustrates one example of an improved green laminate.

This description of preferred embodiments is intended to be read in connection with the accompanying drawings, which are to be considered part of the entire written description. The drawing figures are not necessarily to scale and certain features of the invention may be shown exaggerated in scale or in somewhat schematic form in the interest of clarity and conciseness. In the description, relative terms such as "horizontal," "vertical," "up," "down," "top," and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral," and the like are to be interpreted relative to one another or relative to an axis of elongation, or an axis or center of rotation, as appropriate. Terms concerning attachments, coupling, and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The terms used in this application shall be accorded the following definitions:

"Biologically produced" as used herein shall mean organic compounds produced by one or more species or strains of living organisms, including particular strains of yeast, fungus, bacteria, and other microbes. Such organic compounds include carbon from atmospheric $CO_2$ converted to sugars and starches by plants.

"Fossil carbon" as used herein shall mean carbon of petrochemical origin, i.e., carbon that has not been exposed to ultraviolet ("UV") rays like green carbon. Therefore, masses of fossil carbon have few radioisotopes in their population.

"Green carbon" as used herein shall mean carbon atoms from $CO_2$ molecules that have in the last several decades been free in the Earth's atmosphere and are identifiable by the presence of the radioisotope carbon-14 ($^{14}C$).

"Green polyethylene" or "green PE" as used herein shall mean polyethylene of which is at least partially derived from materials that have in the last several decades been free in the Earth's atmosphere and are identifiable by the presence of $^{14}C$.

"Green polyethylene terephthalate" or "green PET" as used herein shall mean polyethylene terephthalate of which is at least partially derived from materials that have in the last several decades been free in the Earth's atmosphere and are identifiable by the presence of $^{14}C$.

Unless otherwise stated, all percentages, parts, ratios, or the like are by weight. When an amount, concentration, or other value or parameter is given as either a range, preferred range, or a list of upper preferable values and lower preferable values, this is understood as specifically disclosing all ranges formed from any pair of any upper range limit or preferred value and any lower range limit or preferred value regardless of whether those ranges are explicitly disclosed.

Approximately 99 percent of the carbon in the Earth's biosphere is carbon-12 ($^{12}C$), which is a stable isotope of carbon. The remaining one percent of the carbon in the Earth's biosphere is substantially comprised of carbon-13 ($^{13}C$), which is also a stable isotope of carbon, with trace amounts of $^{14}C$ being present. $^{14}C$ is created when nitrogen is struck by a UV light produced neutron causing the nitrogen to lose a proton and form $^{14}C$, which shortly thereafter forms $CO_2$. The $^{14}C$-containing $CO_2$ is cycled by plants to make organic molecules during photosynthesis in accordance with the carbon cycle. Plants and other forms of life metabolize the organic molecules producing $CO_2$, which is released back to the atmosphere. As virtually all forms of life on Earth depend on plant produced organic molecules to produce the chemical energy that facilitates their growth and reproduction, the $^{14}C$ that exists in the atmosphere becomes part of all life and their biological products. These renewable organic molecules that degrade and produce $CO_2$ do not contribute to global warming as there is not a net increase in the amount of carbon emitted into the biosphere. In contrast, fossil fuel based carbon does not include the signature amount of $^{14}C$, but instead comprises $^{12}C$, and contributes to global warming by increasing the amount of carbon in the atmosphere.

Testing methods that include isotope ratio mass spectrometry analysis enable the amount of green carbon in a material to be assessed. Specifically, ASTM International has established a standard method for assessing the biobased content of materials, which it has designated as ASTM-D6866. ASTM-D6866 is built on the same concepts as radiocarbon dating, but without the use of age equations. The analysis includes deriving a ratio of the amount of radiocarbon ($^{14}C$) in an unknown sample to that of a modern reference sample. The ratio is reported as a percentage having the units of "pMC" (percent modern carbon). For example, if the material being analyzed is a mixture of present day $^{14}C$ and fossil carbon, then the pMC value obtained directly correlates to the amount of biomass material present in the sample.

The modern reference sample used in radiocarbon dating is a standard reference material ("SRM") of the National Institute of Standards and Technology ("NIST") having a known radiocarbon content approximately equivalent to the year 1950, which is a time prior to nuclear weapons testing that introduced significant amounts of excess radiocarbons into the atmosphere. The 1950 reference represents 100 pMC, and the values in 2010 are approximately 107.5 pMC.

Combining fossil carbon with radiocarbon into a single material results in a dilution of the pMC content. For example, if a material comprises 50 percent fossil carbon having a value of zero pMC and 50 percent radiocarbon having a 107.5 pMC, then the resultant material would have a radiocarbon signature close to 54 pMC. A biomass content may be derived by assigning 100 percent equal to a value of 107.5 pMC and zero percent to a value of zero pMC such that a sample measuring 99 pMC provides an equivalent biobased content of approximately 93 percent.

FIG. 1 is a cross-sectional view of one example of a laminated structure 100 substantially fabricated from biobased materials that may be used to form food product packaging. As shown in FIG. 1, laminate structure 100 includes an internal sealant layer 102, an external protective layer 104, and an adhesive layer 106 that couples together internal and external protective layers 102 and 104. In some embodiments, adhesive layer may be omitted and internal sealant layer 102 and external protective layer 104 may be coextruded. Internal sealant layer 102 may be disposed on an inner surface of a package having walls or boundaries defined by laminated structure 100 such that internal sealant layer 102 is disposed directly adjacent to the food or other material encased by the package. Internal sealant layer 102 may have a thickness of between 25.4 μm (approximately $1e^{-3}$ inches) and 76.2 μm (approximately $3e^{-3}$ inches), and more particularly, internal sealant layer may have a thickness of approximately 50.8 μm (approximately $2e^{-3}$ inches). In one embodiment, internal sealant layer 102 is formed from green PE, which may be derived from byproducts of sugar cane, molasses, beet root, or the like.

If internal sealant layer 102 is fabricated from Green PE, additional flexible layers (not shown) may be laminated to internal sealant layer 102 to enhance sustainability. For example, inorganic fillers such as $CaCO_3$, talc, mica, or biowaste derived from crops such as wheat, rice, and corn may be implemented to increase the sustainability of internal layer 102. In some embodiments, internal sealant layer 102 may also include inorganic fillers such as $CaCO_3$, talc, mica, or bio-waste derived from crops such as wheat, rice, and corn. In some embodiments, such inorganic fillers may be included on both surfaces of and/or within internal sealant layer 102 as will be understood by one skilled in the art. Other biodegradable additives including, but not limited to EcoPure™ available from Ecologic LLC of Oakbrook Terrace, Ill.; bacterial and microbial additives for polyethylene and polypropylene available from TekPak Solutions of Hamilton, Ontario, Canada, and MasterBatch Pellets™ available from ECM Biofilms of Painesville, Ohio may also be integrated into internal sealant layer 102 to increase the sustainability and ability to biodegrade of internal sealant layer 102.

External protective layer 104 may be disposed on an outer surface of the package having walls or boundaries defined by laminate structure 100 and may also be fabricated from green PET. In one embodiment, external protective layer 104 has a thickness of approximately 12.7 μm (approximately $5e^{-4}$ inches), although external protective layer 204 may have other thicknesses as will be understood by one skilled in the art. In some embodiments, external protective layer 104 is fabricated from other natural polymers including, but not limited to, polylactic acid ("PLA"), cellophane, a thermoplastic starch ("TPS"), or paper. If TPS is used, a moisture barrier layer may be disposed on an outer surface 104a of external sealing layer 104 to enhance the external sealing layer's resistance to water. External protective layer 104 may include inorganic fillers such as, for example, $CaCO_3$, talc, mica, or bio-waste derived from crops, such as wheat, rice, and corn. Such inorganic fillers may also be disposed on surfaces of, and/or used as filler in, external sealing layer 104. Recent advances in radiation cure coatings technologies, such as, e-beam, cationic and UV cure have shown to produce abrasion resistant coatings with improved scruff resistance, flexibility, thermal and mechanical integrity. This has made it possible to apply coatings directly to outer surface 104a instead of reverse printing which requires multiple substrates and laminations. This leads to a sustainable and cost effective packaging solution.

Adhesive layer 106 may be any adhesive that may join together internal and external sealing layers 102 and 104. If a renewable adhesive is used, then laminate structure 100 may have a renewable content approaching 100 percent. If a non-renewable adhesive is used, then laminate structure 100 may have a pMC value of at least approximately 1, 5, 10, 15, 20, 25, 30, 35, 40, 45, 50, 55, 60, 65, 70, 75, 80, 85, 90, 95, and 100 percent.

Figure 2:
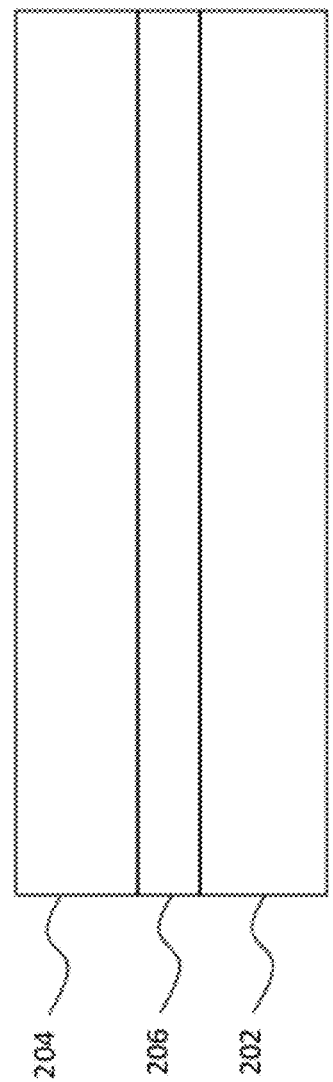
FIG. 2 illustrates another example of an improved green laminate.

FIG. 2 illustrates another example of a laminate structure 200 that may be implemented in food-grade packaging. As shown in FIG. 2, laminate structure 200 includes an inner layer 202 coupled to an outer layer 204 through a passive barrier layer 206. In one embodiment, internal layer 202 and external layer 204 are formed from Green PE, which may be derived from byproducts of sugar cane, molasses, beet root, or other agricultural byproducts that are typically referred to as agro-waste. In some of the foregoing embodiments, Green PE comprises a preferred Melt Index value equal to or greater than 2. Green PE film structures often contain at least 30% Green PE, along with one or more of the following: a) coating/ink/80 gauge cellulosic film/adhesive/1 to 2 mil Green PE; b) 80 gauge cellulosic film/ink/70 ga metallized OPP/adhesive/1 to 2 mil Green PE; 3) coating/ink/70 ga metallized OPP/adhesive/1 to 2 mil Green PE; 4) 80 gauge cellulosic film/ink/28.5 ga aluminum foil/50 ga co-extrusion @50% Green PE/1 to 2 mil Green PE; and 5) 80 gauge cellulosic film/ink/adhesive/Tie-EVOH-Tie/1 to 2 mil Green PE. TIE layers used in the inventions often comprise 50% Green PE.

Additional flexible layers (not shown) may be laminated on internal layer 202 and/or external layer 204 to enhance their sustainability. For example, inorganic fillers such as $CaCO_3$, talc, mica, or bio-waste derived from crops such as wheat, rice, and corn may be laminated on, or used as filler in, internal layer 202 and/or external layer 204 to increase their sustainability. Biodegradable additives including, but not limited to, EcoPure™ available from Ecologic LLC of Oakbrook Terrace, Ill.; bacterial and microbial additives for polyethylene and polypropylene available from TekPak Solutions of Hamilton, Ontario, Canada, and MasterBatch Pellets™ available from ECM Biofilms of Painesville, Ohio may be added to a surface of internal layer 202 and/or external layer 204 to make these layers biodegradable when disposed in a landfill.

Barrier layer 206 may be fabrication from ethylene vinyl alcohol ("EVOH"), nylon, or aluminum foil to act as an oxygen barrier layer for preserving food freshness and/or the shelf life of the packaged food products.

Figure 3A:
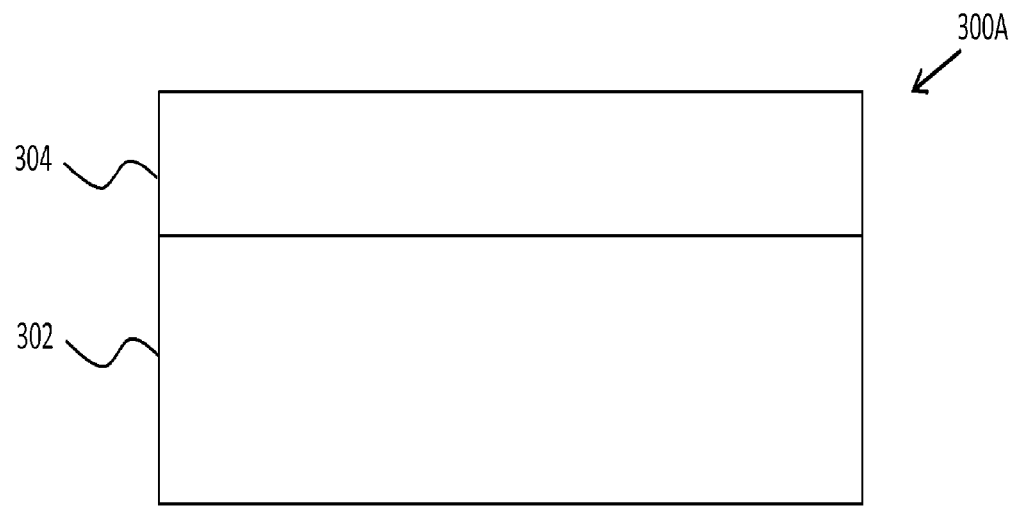
FIGS. 3, 3A, and 3B illustrate other examples of improved green laminate structures.
Figure 3:
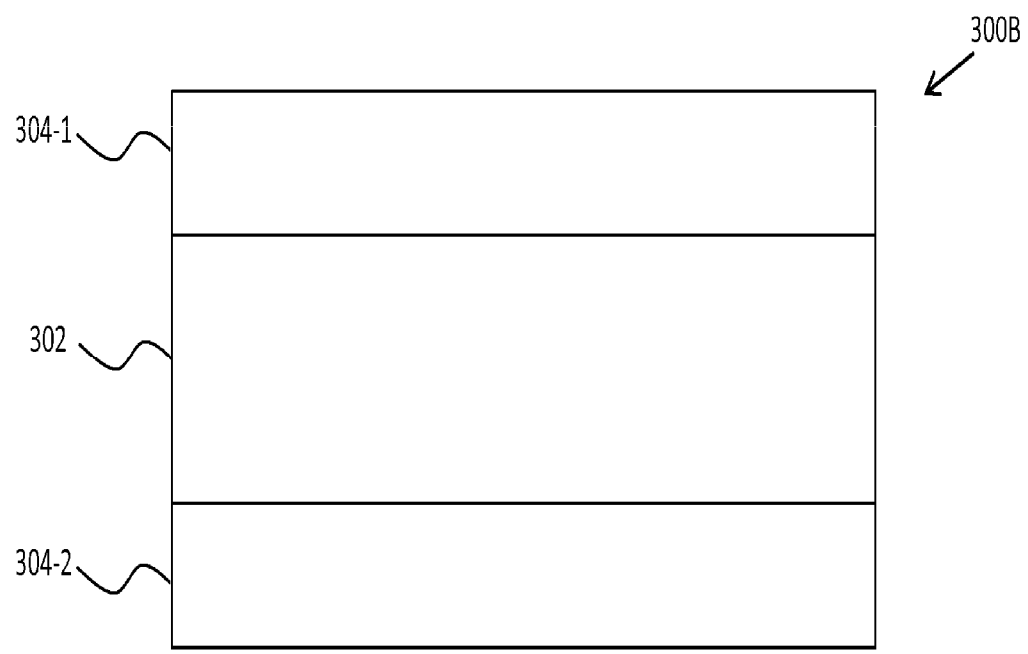

FIG. 3A illustrates another example of a laminate structure 300A in accordance with the present disclosure. As illustrated in FIG. 3A, laminate structure 300A may include an inner layer 302 directly laminated to, or coextruded with, an outer layer 304 Inner layer 302 is formed from green PE and may including one or more additives or fillers for increasing the sustainability and biodegradability of laminate 300A. For example, inorganic fillers including, but not limited to, $CaCO_3$, talc, mica, or bio-waste derived from crops such as wheat, rice, and corn may be laminated on inner layer 302 to increase their sustainability. Additionally or alternatively, biodegradable additives such as EcoPure™ available from Ecologic LLC of Oakbrook Terrace, Ill., bacterial and microbial additives for polyethylene and polypropylene available from TekPak Solutions of Hamilton, Ontario, Canada, and MasterBatch Pellets™ available from ECM Biofilms of Painesville, Ohio, may be added to a surface of inner layer 302 to enhance the biodegradability of inner layer 302.

Outer layer 304 is configured to add protection from inner layer from external environmental contaminants as well as to help seal out water and moisture from the internal contents of the packaging formed by laminate 300. In one embodiment, outer layer 304 is a metallization layer, and in other embodiments, outer layer 304 includes SiOx.

Figure 3B:
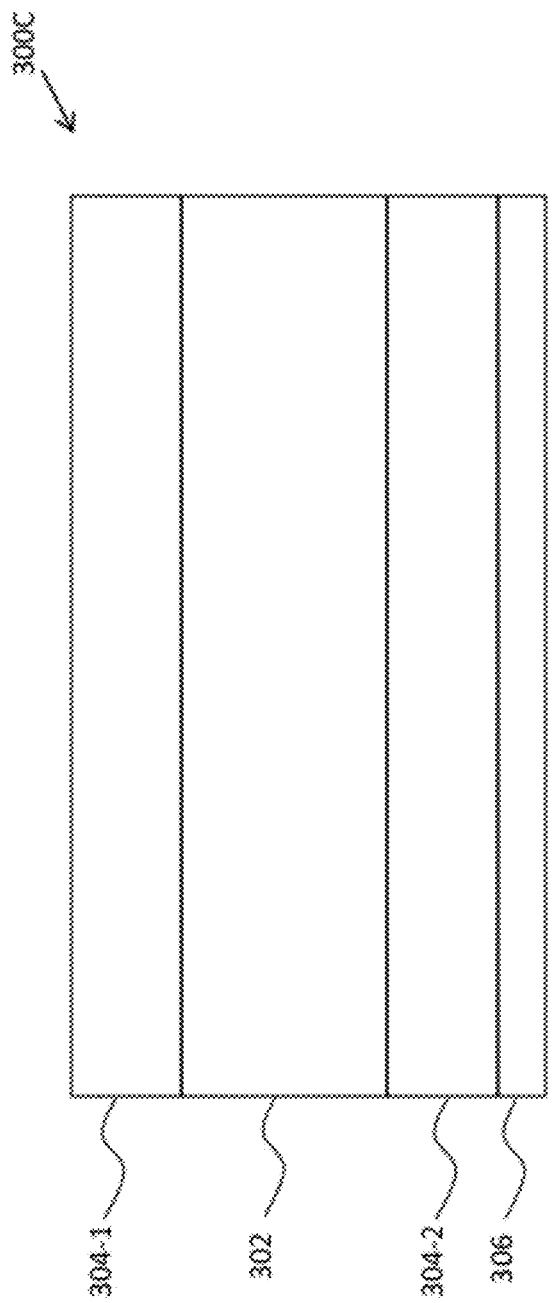

In other embodiments, such as the embodiment illustrated in FIG. 3B, a laminate 300B includes first and second outer layers 304-1 and 304-2 (collectively referred to as "outer layers 304") disposed on opposite sides of internal layer 302. Outer layers 304 may be metallization layers or formed from SiOx. FIG. 3B illustrates yet another embodiment of a laminate 300C in which a sealant or adhesive layer 306 is disposed on one of the outer layers 304.

Figure 4:
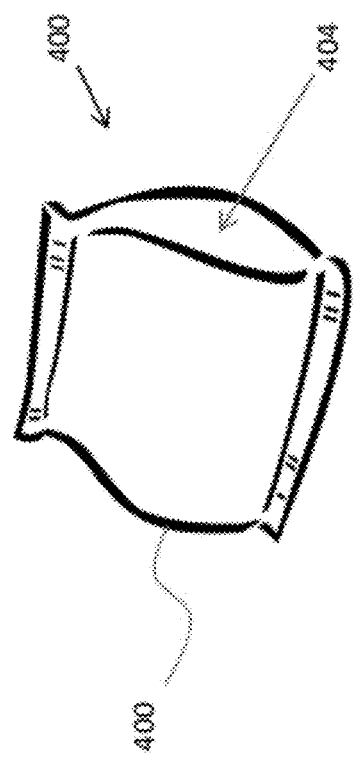
FIG. 4 illustrates one example of a flexible food storage container that includes an improved green laminate structure described herein.

The laminate structures 100, 200, 300A-C formed from Green PE or Green PET described above may be integrated into a wide variety of environmentally friendly food storage and packaging solutions. In some embodiments, the green laminate structures described herein may be used in various flexible food packaging including, but not limited to, potato chip bags, flexible frozen storage bags such as, for example, french fry bags, and condiment containers such as flexible packets used for ketchup, mustard, and mayonnaise. FIG. 4 illustrates one example of such a flexible food storage container 400. As shown in FIG. 4, laminate wall 402, which may be fabricated from one of the laminates 100, 200, and 300A-C described above, defines an internal compartment 404 in which the food product is stored. Additionally, flexible food storage container 400 including wall 400 may have pMC values of at least approximately 1, 5, 10, 15, 20, 25, 30, 35, 40, 45, 50, 55, 60, 65, 70, 75, 80, 85, 90, 95, and 100 percent.

Figure 6:
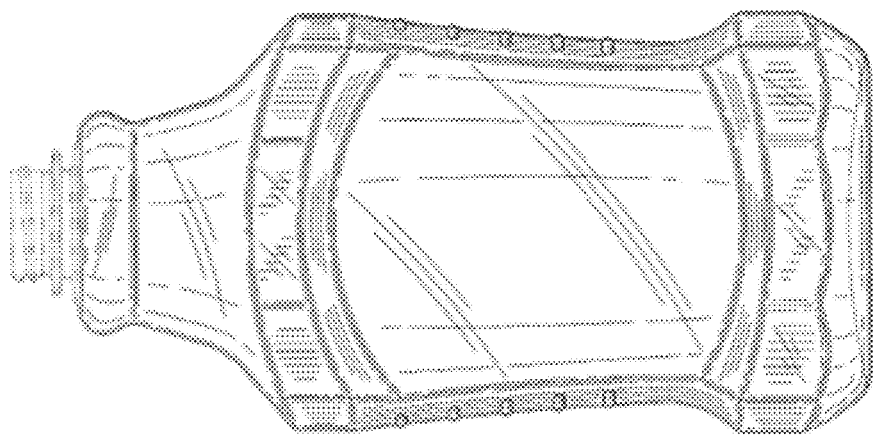
FIG. 6 illustrates one example of a semi-rigid bottle that may be fabricated from Green PE.
Figure 5:
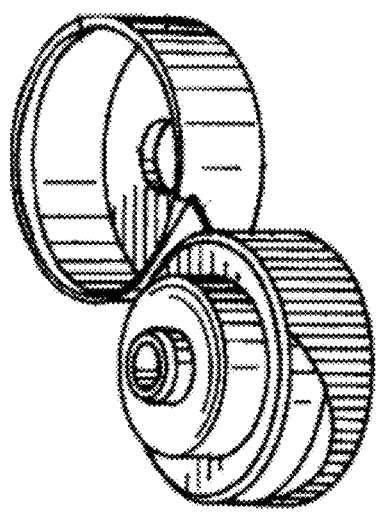
FIG. 5 illustrates one example of a bottle cap that may be fabricated from Green PE.

Green PE may also be used in applications in which high-density poly-ethylene to fabricate high-density polyethylene ("HDPE") such as rigid container closures (e.g., flip-top bottle tops). Hinged closures are traditionally made with polypropylene due to acceptable hinge performance where the hinge does not break with the repetitive opening and closing of the closure. The present invention makes possible all forms of closures, including hinged closures with acceptable hinge performance with the high density polyethylene (HDPE) derived from the green source. This required the green HDPE with a melt index of less than 20. For example, FIG. 5 illustrates one example of a bottle cap or closure that may be fabricated from HDPE derived from Green PE. FIG. 6 illustrates one example of a semi-rigid bottle that may be fabricated from HDPE derived from Green PE. As shown in FIG. 6, the bottle includes a body defining an inner compartment in which a food product may be stored. The cap illustrated in FIG. 5 may be used in combination with the bottle illustrated in FIG. 6 such that some or all of the food storage container or packaging may include Green PE.

The flexible laminates and food packaging disclosed herein may advantageously be incorporated into a wide variety of packaging solutions and help contribute to a reduction in carbon emissions that increase the greenhouse effect. The inclusion of organic and renewable filler materials such as calcium carbonate, talc, as well as agricultural waste like wheat straw, rice hull, and the like, increase the sustainability of the resultant flexible food packaging. Additional laminate layers may also be added to increase the biodegradability of the flexible, rigid, and semi-rigid food packages.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A food package, comprising:
    a laminate body defining an internal compartment and including an inner layer and an outer film layer coupled together and further including an internal sealant layer, an external protective layer, and an adhesive layer that cooperate to couple together said internal and said external layers,
    wherein at least one of the inner layer and outer film layer includes green polyethylene having a percent modern carbon value of at least 30 percent and including at least one of the following:
    a) coating/ink/80 gauge cellulosic film/adhesive/1 to 2 mil green polyethylene;
    b) 80 gauge cellulosic film /ink/70 ga metallized OPP/adhesive/1 to 2 mil green polyethylene;
    c) coating /ink/70 ga metallized OPP/adhesive/1 to 2 mil green polyethylene;
    d) 80 gauge cellulosic film /ink/28.5 ga aluminum foil/50 ga co-extrusion @ 50% green polyethylene/1 to 2 mil green polyethylene; and
    e) 80 gauge cellulosic film/ink/adhesive/Tie-EVOH-Tie/1 to 2 mil Green PE. TIE layers used in the inventions often comprise 50% green polyethylene.

2. The food package of claim 1 wherein said internal sealant layer and said external protective layer are coextruded.

3. The food package of claim 2 wherein said internal sealant layer forms an inner surface of said food package such that said internal sealant layer is disposed directly adjacent to food.

4. The food package of claim 3 wherein said internal sealant layer has a thickness of between 25.4 µm and 76.2 µm.

5. The food package of claim 3 wherein said internal sealant layer has a thickness of approximately 50.8 µm.

6. The food package of claim 5 wherein said internal sealant layer is formed from green PE comprising byproducts of at least one of sugar cane, molasses, and beet root.

7. The food package of claim 3 wherein said internal sealant layer comprises inorganic fillers derived from crops.

8. The food package of claim 1 wherein said external protective layer is disposed on an outer surface of said food package having walls or boundaries defined by said laminate body fabricated from green PET.

9. The food package of claim 1 wherein said external protective layer has a thickness of approximately 12.7 µm and is fabricated from polymers selected from the group consisting of, polylactic acid ("PLA"), cellophane, a thermoplastic starch ("TPS"), and paper.

10. The food package of claim 9 wherein TPS is used as a moisture barrier layer disposed on an outer surface of said external sealing layer.

11. The food package of claim 10 wherein said external protective layer includes inorganic fillers derived from crops.

12. The food package of claim 1 wherein said external protective layer comprises a radiation cure to provide an abrasion resistant coating with improved scruff resistance, flexibility, thermal and mechanical integrity.

13. The food package of claim 12 wherein said adhesive layer joins together said internal and said external sealing layers.

14. The food package of claim 1 wherein said green polyethylene comprises a preferred Melt Index value equal to or greater than 2.

15. A food package, comprising:
    a laminate body defining an internal compartment for storing a food product, said laminate body including an inner layer and an outer film layer coupled together and further including an internal sealant layer, an external protective layer, and an adhesive layer that couples together said internal and said external layers,
    wherein at least one of the inner layer and outer film layer includes green polyethylene having a percent modern carbon value of at least 30 percent and including at least one of the following:
    a) coating/ink/80 gauge cellulosic film/adhesive/1 to 2 mil green polyethylene;
    b) 80 gauge cellulosic film/ink/70 ga metallized OPP/adhesive/1 to 2 mil green polyethylene;
    c) coating/ink/70 ga metallized OPP/adhesive/1 to 2 mil green polyethylene;
    d) 80 gauge cellulosic film/ink/28.5 ga aluminum foil/50 ga co-extrusion @ 50% green polyethylene/1 to 2 mil green polyethylene; and
    e) 80 gauge cellulosic film/ink/adhesive/Tie-EVOH-Tie/1 to 2 mil Green PE. TIE layers used in the inventions often comprise 50% green polyethylene; and
    a cap coupled to the laminate body for sealing the food product within the internal compartment.

16. The food package of claim 15 wherein both the laminate body and cap include green polyethylene having a percent of modern carbon value of at least 30 percent.

17. The food package of claim 16 wherein said laminate body and cap are joined by a hinge formed from green HDPE with a melt index of less than twenty.

* * * * *